United States Patent Office 2,852,482
Patented Sept. 16, 1958

2,852,482

VINYLIDENE POLYMER-DIALKYL PHTHALATE-ALKYL ESTER PLASTISOL COMPOSITIONS

Paul R. Graham, Richmond Heights, Mo., assignor to Monsanto Chemical Company, St. Louis, Mo., a corporation of Delaware No Drawing. Application February 7, 1955
Serial No. 486,705

12 Claims. (Cl. 260—31.2)

This invention relates to certain plastisols and in particular relates to methods for increasing the useful life thereof.

"Plastisol" is a term adapted by the art to which this invention pertains to designate a colloidal dispersion of halogenated vinylidene polymer of microscopic ultimate particle size in liquid plasticizers therefor. It is a 100% total solid material, and is not to be confused with organosols, which contain volatile solvents or thinners (Modern Plastics, vol. 29, page 87, December 1951).

Plastisols are prepared by dispersing the solid halogenated vinylidene polymer in a liquid plasticizer by means well known in the art as for example by use of ordinary mixing equipment of the trade. At the same time pigments, fillers and like compounding materials are usually incorporated. The resultant compounded plastisols are of a viscous nature and in appearance vary from viscous liquids to pasty materials.

The plastisols are frequently employed in making hollow molded elastomeric articles of various wall thicknesses. This is accomplished either by placing the plastisol in a hollow mold or by dipping a one-piece male mold into the plastisol. Plastisols are also employed in the "no-mold" molding technique, as for example in covering automotive light socket assemblies with a snug dust-and-water resistant removable cover by simply immersing the assembly in the plastisol to the proper depth. The plastisol coating resulting from any of these molding techniques is fused to an elastomeric compound by heating while in or on the mold. The usual fusion or fluxing temperature of plastisols is in the range of 300° F. to 400° F., the fusing or fluxing of the component parts of the plastisol is practically instantaneous. Upon cooling, the finished molded articles can be removed from the mold and are ready for use, or in case of a coated assembly, the assembly is ready for installation or packing.

It is apparent that for optimum use in molding, the plastisols must have an element of fluidity in order that they can be poured, sucked or pumped into molds or in order that they will flow around articles to be coated. Usually when freshly prepared, the viscous liquid plastisols, that is those containing about 60 to 100 parts by weight of plasticizers for each 100 parts by weight of resin, are sufficiently fluid so that they can be employed to fill molds or can be employed in the dip molding process. However, the viscosity of such liquid plastisols increases appreciably in but a few days after being prepared as hereinafter will be demonstrated. This increase in viscosity means that the plastisol can no longer be sucked or poured into molds or that a greatly increased power input is required to pump them into molds.

The pasty plastisols, that is those containing from about 25 to about 60 parts by weight of plasticizers per 100 parts of resin, are used in molding and also increase in viscosity on standing. Where they are used in dip molding, pasty plastisols of increased viscosity produce a non-uniform and an uneven coating.

Since molding with a plastisol is intended to provide an inexpensive rapid method for molding elastomeric articles and to provide a method for producing a uniformly tailored molded protective coating at low cost, it is extremely important that the viscosity of the plastisol be maintained within reasonable usable values even after the plastisol is seven to fourteen days old. When the viscosity of the plastisol increases beyond the usable limit, it is apparent that the user thereof will suffer a loss or be put to additional expense in returning the plastisol to a usable material. Thus, it is readily apparent that a plastisol which does not change appreciably in viscosity even after being stored for as long as two weeks would be an exceedingly useful composition.

In accordance with this invention it has been found that the useful life of a plastisol containing a liquid dialkyl phthalate plasticizer can be substantially increased by dissolving therein 0.5 to 5 parts by weight per 100 parts resin of an alkyl ester of a mixture of long chain unsaturated fatty acids. Illustrative of such acids are palmitoleic acid, oleic acid, linoleic acid, linolenic acid, gadoleic acid, erucic acid and the like in the form of various mixtures. The preferred esters are those obtained upon esterifying a mixture of long chain unsaturated fatty acids having at least 16 carbon atoms per molecule and preferably averaging 18 carbon atoms per molecule with a monohydric aliphatic alcohol.

This remarkable result is dependent upon the different unsaturated fatty acids being mixed prior to the formation of the alkyl ester, however, the reaction is not completely understood.

The mixed esters of this invention are prepared by several well known methods, e. g. by esterifying a preformed mixture of unsaturated long chain fatty acids with a monohydric aliphatic alcohol or mixture thereof in the presence of an esterification catalyst.

As illustrative of various alkyl esters of the ester mixture contemplated by this invention are isopropyl oleate, n-butyl oleate, n-hexyl oleate, 2-ethylhexyl oleate, n-decyl oleate, isodecyl oleate, dodecyl oleate, octadecyl oleate, n-butyl linoleate, isoamyl linoleate, 2-ethylhexyl linoleate, dodecyl linoleate, octadecyl linoleate, isobutyl linolenate, isohexyl linolenate, isodecyl linolenate, etc. A particularly preferred and useful, cheap and plentiful group of alkyl esters of mixed long chain unsaturated fatty acids are those prepared by esterification of $C_{18}$ unsaturated fatty acid mixtures obtained from tall oil, wherein the esterifying monohydric aliphatic alcohol contains from 3 to 18 carbon atoms. This mixture of fatty acids consists chiefly of oleic acid and linoleic acid and depending upon the source of the tall oil there may be present linolenic acid. In general the mixture of unsaturated fatty acids obtained from tall oil will contain 15% to 55% oleic acid, 20% to 80% linoleic acid, and 0 to 40% linolenic acid.

The plasticizers of this invention are those liquid dialkyl phthalates which will not dissolve the dispersion type resin at ordinary temperatures, but which will dissolve the resin at elevated temperatures and form a gel on cooling. Examples of such plasticizers employed in the preparation of plastisols of this invention are the liquid dialkyl phthalates whose ester groups contain a total of at least 8 carbon atoms, such as dibutyl phthalate; diamyl phthalate; dihexyl phthalate; diheptyl phthalate; butyl octyl phthalate; the dioctyl phthalates such as di-(n-octyl) phthalates; di(2-ethylhexyl) phthalate; diisooctyl phthalates; didecyl phthalate; didodecyl phthalate, and mixtures of dialkyl phthalates which have an average of 8 carbon atoms in the alkyl groups such as exist in a mixture of diheptyl phthalate, dioctyl phthalate, and dinonyl phthalate. The alkyl ester groupings may be like or unlike.

The halogen-containing resins of this invention are those derived from such vinylidene compounds as vinyl chloride, vinylidene chloride, vinyl chloroacetate, chloro styrene, chlorobutadienes, etc., and those copolymers of such vinylidene compounds and other unsaturated materials copolymerizable therewith, for example, copolymers of a vinylidene halide such as vinyl chloride with such materials as vinylidene chloride, vinyl esters of carboxylic acids, for example, vinyl acetate, vinyl propionate, vinyl butyrate, vinyl benzoate; esters of unsaturated acids, for example, alkyl acrylates, such as methyl acrylate, ethyl acrylate, propyl acrylate, butyl acrylate, allyl acrylate and the corresponding esters of methacrylic acid; vinyl aromatic compounds, for example styrene, ortho-chloro-styrene, parachloro-styrene, 2,5-dichloro-styrene, 2,4-dichloro-styrene, para-ethyl-styrene, divinyl benzene, vinyl naphthalene, alpha-methyl styrene; dienes, such as butadiene, chlorobutadiene; unsaturated amides, such as acrylic acid amide, acrylic acid anilide; unsaturated nitriles, such acrylic acid nitrile; esters of α,β-unsaturated carboxylic acids, for example, the methyl, ethyl, propyl, butyl, amyl, hexyl, heptyl, octyl, allyl, methallyl, and phenyl esters of maleic, crotonic, itaconic, fumaric acids and the like. The class of copolymers in which a predominant proportion, i. e. more than 50% by weight of copolymer is made from a halogen-containing vinylidene compound such as vinyl chloride, represents a preferred class of resins to be treated in accordance with this invention.

A particularly preferred embodiment of the invention comprises increasing the useful life of plastisols whose resin content is prepared by copolymerizing vinyl chloride and an ester of an α,β-unsaturated dicarboxylic acid such as diethyl maleate or other esters of maleic, fumaric, aconitic, itaconic acid, etc., in which 5–20 parts by weight of diethyl maleate or other analogous esters are used for every 95–80 parts by weight of vinyl chloride. Among the preferred esters of α,β-unsaturated dicarboxylic acids are the alkyl esters in which the alkyl group contains 1–8 carbon atoms.

The alkyl esters of the mixed unsaturated fatty acids of this invention are also effective in plastisols of halogen-containing resins containing halogens other than chlorine, e. g. bromine, fluorine and iodine. The halogen-containing resins may contain a varying proportion of halogen depending upon the nature of the resin and its contemplated use.

The above halogen-containing dispersion type resins and their preparation are well known in the art. They are usually prepared by a conventional aqueous emulsion polymerization which produces a latex-like dispersion of the halogen-containing resin. The polymeric material is recovered from the latex-like dispersion by a coagulation or flocculation process as a fine powder wherein usually 95% of the particles are within ±0.05 micron of the mean particle size. Halogen-containing dispersion type resins having an average particle size in a wide range, as for example from about 0.05 to about 200 microns, may be employed in practicing this invention, however, the use of powdery halogen-containing resins having an average particle size of from 0.05 to about 30 microns is preferred. Powdery dispersion type resins having a particle size less than 0.05 micron tend to dissolve readily in the plasticizer and cause the plastisol to gel. Powdery dispersion resins having an average particle size greater than about 30 microns tend to form grainy plastisols.

As illustrative of this invention but not limitative thereof is the following:

Plastisol compositions are prepared by stirring together in weight proportions set forth below a dispersion type halogen-containing resin having an average particle size of 2.29 microns, a liquid phthalate plasticizer therefor, and an alkyl ester of a mixture of long chain unsaturated fatty acids.

Table I

| Composition | A | B | C | D | E |
| --- | --- | --- | --- | --- | --- |
| Polyvinyl chloride | 100 | 100 | 100 | 100 | 100 |
| Di(2-ethylhexyl) phthalate | 80 | | 78 | | 78 |
| Butyl benzyl phthalate | | 80 | | 78 | |
| Butyl ester of tall oil unsaturated fatty acids* | | | 2 | 2 | |
| Isodecyl ester of tall oil unsaturated fatty acids* | | | | | 2 |

*Contains approximately 51% by weight oleic acid, approximately 46% by weight linoleic acid, and 3% inert material.

The viscosity of the compositions set forth above at 25° C., 40° C. and 50° C. obtained on the Brookfield Model LVF viscometer using the No. 4 spindle at 12 R. P. M. in poises on standing is as follows for the listed periods of time:

Table II

| Composition | A | B | C | D | E |
| --- | --- | --- | --- | --- | --- |
| 4 hours at 25° C | 36 | 35 | 28 | 32 | 36 |
| 1 day at 25° C | 65 | 50 | 36 | 74 | 48 |
| 7 days at 25° C | 97 | 85 | 42 | 72 | 52 |
| 14 days at 25° C | 116 | 122 | 43 | 102 | 52 |
| 28 days at 25° C | 132 | 164 | 50 | 116 | 52 |
| 4 hours at 40° C | 37 | 37 | 25 | 42 | 30 |
| 1 day at 40° C | 84 | 163 | 61 | 258 | 67 |
| 7 days at 40° C | 215 | gel | 75 | gel | 86 |
| 4 hours at 50° C | 66 | gel | 32 | 358 | 45 |
| 1 day at 50° C | >1,000 | | 139 | gel | 136 |

Similar results to the foregoing are obtained upon replacing the butyl or isodecyl ester of tall oil unsaturated fatty acids with the corresponding isopropyl, n-amyl, 2-ethylhexyl, n-dodecyl and octadecyl esters, respectively.

Although the mixture of long chain unsaturated fatty acids may contain two or more different acids, it is preferred that one be oleic acid and such be present in amounts of 15% to 70% by weight based on the total mixed unsaturated long chain fatty acid content.

While this invention has been described with respect to certain embodiments it is not so limited and it is to be understood that variations and modifications thereof may be made which are obvious to those skilled in the art without departing from the spirit or scope of this invention.

What is claimed is:

1. An improved plastisol capable of being fused upon heating into a stable, continuous phase, comprising a solid thermoplastic halogenated vinylidene polymer of particle size in the range of about 0.05 micron to about 200 microns dispersed in a liquid dialkyl phthalate plasticizer for said halogenated vinylidene polymer, the weight proportions being in the range of about 25 to 100 parts of the plasticizer to 100 parts of the halogenated vinylidene polymer, and containing dissolved therein 0.5 to 5 parts by weight per 100 parts of the halogenated vinylidene polymer of an ester obtained by esterifying a mixture of unsaturated long chain fatty acids containing 16 to 22 carbon atoms with a monohydric aliphatic alcohol containing from 3 to 18 carbon atoms.

2. The composition of claim 1 wherein one of the acids of the mixture of unsaturated long chain fatty acids is oleic acid, the said oleic acid being present in the mixture in an amount in the range of 15% to 70% by weight based on the total unsaturated long chain fatty acid content.

3. An improved plastisol capable of being fused upon heating into a stable, continuous phase, comprising a solid thermoplastic chlorinated vinylidene polymer of particle size in the range of about 0.05 micron to about 30 microns dispersed in a liquid dialkyl phthalate plasticizer for said chlorinated vinylidene polymer, the weight proportions being in the range of about 60 to 100 parts of the plasticizer to 100 parts of the chlorinated vinylidene polymer, and containing dissolved therein 0.5 to 5 parts by weight per 100 parts chlorinated vinylidene polymer of an ester obtained by esterifying a mixture of $C_{18}$ unsaturated fatty acids obtained from tall oil with a monohydric aliphatic alcohol containing from 3 to 18 carbon atoms.

4. The composition of claim 3 wherein the chlorinated vinylidene polymer contains at least 50% by weight vinyl chloride.

5. The composition of claim 3 wherein the chlorinated vinylidene polymer is a vinyl chloride-vinyl acetate copolymer containing at least 50% by weight vinyl chloride.

6. The composition of claim 3 wherein the chlorinated vinylidene polymer is a vinyl chloride-diethyl maleate copolymer containing at least 80% by weight vinyl chloride.

7. The composition of claim 3 wherein the chlorinated vinylidene polymer contains at least 50% by weight vinyl chloride and wherein the plasticizer is a liquid diester of phthalic acid whose ester groups contain a total of at least 8 carbon atoms.

8. The composition of claim 3 wherein the chlorinated vinylidene polymer is polyvinyl chloride and wherein the plasticizer is a liquid di-alkyl ester of phthalic acid whose alkyl ester groups contain a total of at least 8 carbon atoms.

9. The composition of claim 8 wherein the phthalic ester plasticizer is a dioctyl phthalate.

10. The composition of claim 8 wherein the phthalate ester is di(2-ethylhexyl) phthalate.

11. The composition of claim 8 wherein the phthalate ester is di(2-ethylhexyl) phthalate and wherein the alkyl ester of an unsaturated long chain fatty acid is a mixture of butyl oleate said mixture of esters being obtained by esterifying a mixture of oleic acid and linoleic acid, said oleic acid being present in an amount in the range of 15% to 70% by weight of the acid mixture and butyl linoleate.

12. The composition of claim 8 wherein the phthalate ester is di(2-ethylhexyl) phthalate and wherein the alkyl ester of an unsaturated long chain fatty acid is a mixture of isodecyl oleate and isodecyl linoleate.

References Cited in the file of this patent

UNITED STATES PATENTS

| | | |
|---|---|---|
| 2,585,222 | Bruins et al. | Feb. 12, 1952 |
| 2,711,999 | Brandner et al. | June 28, 1955 |

OTHER REFERENCES

Doolittle: "The Technology of Solvents and Plasticizers," copyright 1954, pages 945 and 946.